US012464113B2

United States Patent
Chiang et al.

(10) Patent No.: US 12,464,113 B2
(45) Date of Patent: Nov. 4, 2025

(54) METHOD AND APPARATUS USING BOUNDARY MATCHING FOR MODE SELECTION IN VIDEO CODING SYSTEM

(71) Applicant: MEDIATEK INC., Hsinchu (TW)

(72) Inventors: Man-Shu Chiang, Hsinchu (TW); Chun-Chia Chen, Hsinchu (TW); Chih-Wei Hsu, Hsinchu (TW); Shih-Ta Hsiang, Hsinchu (TW); Ching-Yeh Chen, Hsinchu (TW); Tzu-Der Chuang, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 120 days.

(21) Appl. No.: 18/065,179

(22) Filed: Dec. 13, 2022

(65) Prior Publication Data
US 2023/0224455 A1     Jul. 13, 2023

Related U.S. Application Data

(60) Provisional application No. 63/297,250, filed on Jan. 7, 2022.

(51) Int. Cl.
*H04N 19/00*     (2014.01)
*H04N 19/105*     (2014.01)
(Continued)

(52) U.S. Cl.
CPC ......... *H04N 19/105* (2014.11); *H04N 19/139* (2014.11); *H04N 19/176* (2014.11); *H04N 19/70* (2014.11)

(58) Field of Classification Search
None
See application file for complete search history.

(56) References Cited

U.S. PATENT DOCUMENTS 11,330,284 B2    5/2022   Li et al.
11,470,348 B2   10/2022   Su et al.
(Continued)

FOREIGN PATENT DOCUMENTS

TW    201639369 A    11/2016
TW    201840183 A    11/2018
(Continued)

OTHER PUBLICATIONS

Chinese language office action dated Nov. 13, 2023, issued in application No. TW 112100575.

*Primary Examiner* — Zhihan Zhou
(74) *Attorney, Agent, or Firm* — McClure, Qualey & Rodack, LLP

(57) ABSTRACT

A method and apparatus for video coding. According to the method, a set of candidates associated with coding modes or mode parameters are determined. Boundary matching costs associated with the set of candidates are determined, where each of the boundary matching costs is determined for one target candidate of the set of candidates. The costs are calculated by using reconstructed or predicted samples of the current block and one or more neighboring blocks of the current block. Each of the boundary matching costs is calculated using one target configuration selected from a plurality of configurations. A final candidate is selected from the set of candidates based on the boundary matching costs. The current block is encoded or decoded using the final candidate.

16 Claims, 11 Drawing Sheets

(51) Int. Cl.
    *H04N 19/139*     (2014.01)
    *H04N 19/176*     (2014.01)
    *H04N 19/70*     (2014.01)

(56) References Cited

U.S. PATENT DOCUMENTS

| | | | |
|---|---|---|---|
| 2003/0108099 A1 | 6/2003 | Nagumo | |
| 2016/0286229 A1* | 9/2016 | Li | H04N 19/96 |
| 2018/0184117 A1* | 6/2018 | Chen | H04N 19/52 |
| 2018/0241998 A1* | 8/2018 | Chen | H04N 19/109 |
| 2018/0302631 A1* | 10/2018 | Chiang | H04N 19/176 |
| 2020/0344492 A1* | 10/2020 | Hsiao | H04N 19/70 |
| 2021/0266595 A1* | 8/2021 | Su | H04N 19/70 |
| 2021/0321092 A1 | 10/2021 | Zhang | |
| 2023/0209042 A1 | 6/2023 | Chiang | |
| 2024/0323353 A1* | 9/2024 | Zhang | H04N 19/52 |

FOREIGN PATENT DOCUMENTS

| | | |
|---|---|---|
| TW | 202015441 A | 4/2020 |
| TW | 202044841 A | 12/2020 |

\* cited by examiner

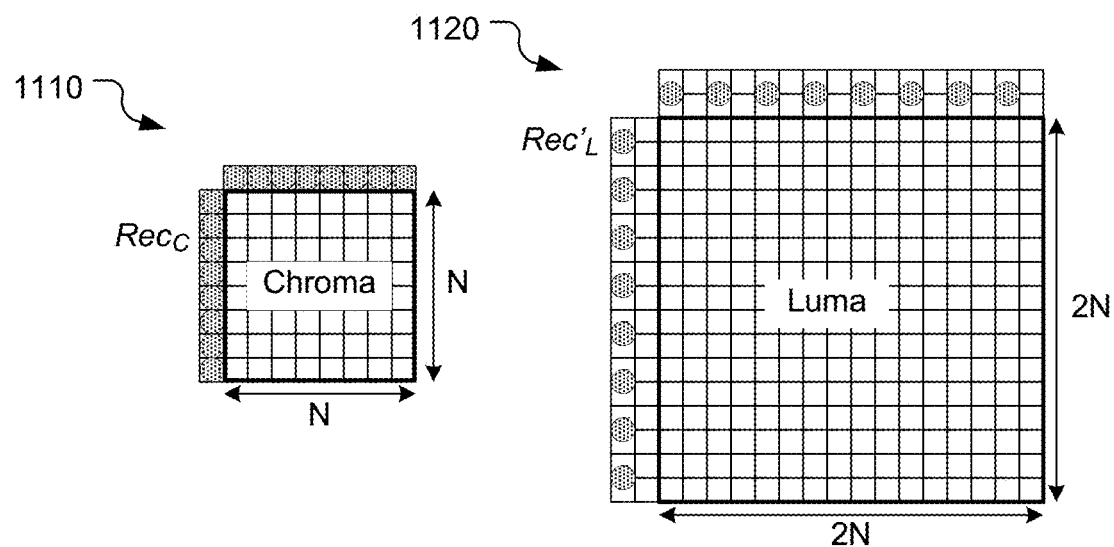
*Fig. 11*
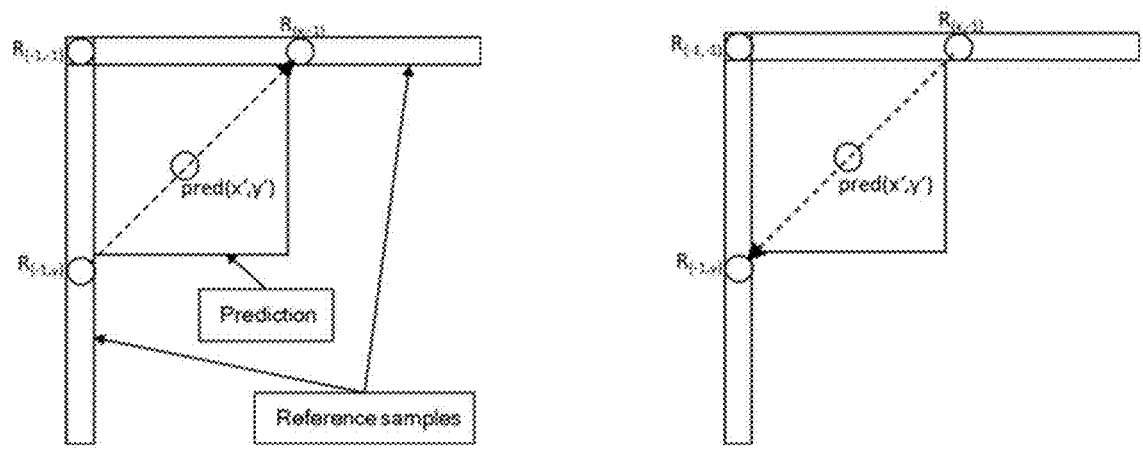
*Fig. 12A*     *Fig. 12B*

METHOD AND APPARATUS USING BOUNDARY MATCHING FOR MODE SELECTION IN VIDEO CODING SYSTEM

CROSS REFERENCE TO RELATED APPLICATIONS

The present invention is a non-Provisional Application of and claims priority to U.S. Provisional Patent Application No. 63/297,250, filed on Jan. 7, 2022. The U.S. Provisional Patent Application is hereby incorporated by reference in its entirety.

FIELD OF THE INVENTION

The present invention relates to video coding system. In particular, the present invention relates to a new video coding tool for mode selection based on boundary matching in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. Among various new coding tools, some coding tools relevant to the present invention are reviewed as follows.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 2, there are four splitting types in multi-type tree structure, vertical binary splitting (SPLIT_BT_VER 210), horizontal binary splitting (SPLIT_BT_HOR 220), vertical ternary splitting (SPLIT_TT_VER 230), and horizontal ternary splitting (SPLIT_TT_HOR 240). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the color component of the CU.

FIG. 3 illustrates the signaling mechanism of the partition splitting information in quadtree with nested multi-type tree coding tree structure. A coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signaled to indicate whether the node is further partitioned; when a node is further partitioned, a second flag (mtt_split_cu_vertical_flag) is signaled to indicate the splitting direction, and then a third flag (mtt_split_cu_binary_flag) is signaled to indicate whether the split is a binary split or a ternary split. Based on the values of mtt_split_cu_vertical_flag and mtt_split_cu_binary_flag, the multi-type tree slitting mode (MttSplitMode) of a CU is derived as shown in Table 1.

TABLE 1

MttSplitMode derviation based on multi-type tree syntax elements

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 4 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consists of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined and specified by SPS syntax elements for the quadtree with nested multi-type tree coding tree scheme.
CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinBtSize and MinTtSize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node could be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinBtSize and smaller or equal to 2*MinTtSize, no further horizontal splitting is considered. Similarly, when the multi-type tree node has height equal to MinBtSize and smaller or equal to 2*MinTtSize, no further vertical splitting is considered.

To allow 64×64 Luma block and 32×32 Chroma pipelining design in VVC hardware decoders, TT split is forbidden when either width or height of a luma coding block is larger than 64, as shown in FIG. 5, where block 500 corresponds to a 128×128 luma CU. The CU can be split using vertical binary partition (510) or horizontal binary partition (520). After the block is split into 4 CUs, each size is 64×64, the CU can be further partitioned using partitions including TT. For example, the upper-left 64×64 CU is partitioned using vertical ternary splitting (530) or horizontal ternary splitting (540). TT split is also forbidden when either width or height of a chroma coding block is larger than 32.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three color components unless the video is monochrome.

CU Splits on Picture Boundaries

As done in HEVC, when a portion of a tree node block exceeds the bottom or right picture boundary, the tree node block is forced to be split until the all samples of every coded CU are located inside the picture boundaries. The following splitting rules are applied in the VVC:
  If any portion of a tree node block exceeds the bottom or the right picture boundaries, and any of QT, BT and TT splitting is not allowed due to block size restriction, the block is forced to be split with QT split mode.
  Otherwise if a portion of a tree node block exceeds both the bottom and the right picture boundaries,
    If the block is a QT node and the size of the block is larger than the minimum QT size, the block is forced to be split with QT split mode.
    Otherwise, the block is forced to be split with SPLIT_BT_HOR mode
  Otherwise if a portion of a tree node block exceeds the bottom picture boundaries,
    If the block is a QT node, and the size of the block is larger than the minimum QT size, and the size of the block is larger than the maximum BT size, the block is forced to be split with QT split mode.
    Otherwise, if the block is a QT node, and the size of the block is larger than the minimum QT size and the size of the block is smaller than or equal to the maximum BT size, the block is forced to be split with QT split mode or SPLIT_BT_HOR mode.
    Otherwise (the block is a BTT node or the size of the block is smaller than or equal to the minimum QT size), the block is forced to be split with SPLIT_BT_HOR mode.
  Otherwise if a portion of a tree node block exceeds the right picture boundaries,
    If the block is a QT node, and the size of the block is larger than the minimum QT size, and the size of the block is larger than the maximum BT size, the block is forced to be split with QT split mode.
    Otherwise, if the block is a QT node, and the size of the block is larger than the minimum QT size and the size of the block is smaller than or equal to the maximum BT size, the block is forced to be split with QT split mode or SPLIT_BT_VER mode.
    Otherwise (the block is a BTT node or the size of the block is smaller than or equal to the minimum QT size), the block is forced to be split with SPLIT_BT_VER mode.

Restrictions on Redundant CU Splits

The quadtree with nested multi-type tree coding block structure provides a highly flexible block partitioning structure. Due to the types of splits supported the multi-type tree, different splitting patterns could potentially result in the same coding block structure. In VVC, some of these redundant splitting patterns are disallowed.

FIG. 6 illustrates the redundant splitting patterns of binary tree splits and ternary tree splits. As shown in FIG. 6, two levels of consecutive binary splits in one direction (vertical 610 and horizontal 630) could have the same coding block structure as a ternary tree split (vertical 620 and horizontal 640) followed by a binary tree split of the central partition. In this case, the binary tree split (in the given direction) for the central partition of a ternary tree split is prevented by the syntax. This restriction applies for CUs in all pictures.

When the splits are prohibited as described above, signaling of the corresponding syntax elements is modified to account for the prohibited cases. For example, when any case in FIG. 6 is identified (i.e. the binary split is prohibited for a CU of a central partition), the syntax element mtt_split_cu_binary_flag which specifies whether the split is a binary split or a ternary split is not signaled and is instead inferred to be equal to 0 by the decoder.

Virtual Pipeline Data Units (VPDUs)

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied in VTM, as shown in FIG. 7:
  TT split is not allowed (as indicated by "X" in FIG. 7) for a CU with either width or height, or both width and height equal to 128.
  For a 128×N CU with N≤64 (i.e. width equal to 128 and height smaller than 128), horizontal BT is not allowed.
  For an N×128 CU with N≤64 (i.e. height equal to 128 and width smaller than 128), vertical BT is not allowed. In FIG. 7, the luma block size is 128×128. The dashed lines indicate block size 64×64. According to the constraints mentioned above, examples of the partitions not allowed are indicated by "X" as shown in various examples (710-780) in FIG. 7.

Intra Chroma Partitioning and Prediction Restriction

In typical hardware video encoders and decoders, processing throughput drops when a picture has more small intra blocks because of sample processing data dependency between neighboring intra blocks. The predictor generation of an intra block requires top and left boundary reconstructed samples from neighboring blocks. Therefore, intra prediction has to be sequentially processed block by block.

In HEVC, the smallest intra CU is 8×8 luma samples. The luma component of the smallest intra CU can be further split into four 4×4 luma intra prediction units (Pus), but the chroma components of the smallest intra CU cannot be further split. Therefore, the worst case hardware processing throughput occurs when 4×4 chroma intra blocks or 4×4 luma intra blocks are processed. In VVC, in order to improve worst case throughput, chroma intra CBs smaller than 16 chroma samples (size 2×2, 4×2, and 2×4) and chroma intra CBs with width smaller than 4 chroma samples (size 2×N) are disallowed by constraining the partitioning of chroma intra CBs.

In single coding tree, a smallest chroma intra prediction unit (SCIPU) is defined as a coding tree node whose chroma block size is larger than or equal to 16 chroma samples and has at least one child luma block smaller than 64 luma samples, or a coding tree node whose chroma block size is not 2×N and has at least one child luma block 4×N luma samples. It is required that in each SCIPU, all CBs are inter, or all CBs are non-inter, i.e., either intra or intra block copy (IBC). In case of a non-inter SCIPU, it is further required that chroma of the non-inter SCIPU shall not be further split and luma of the SCIPU is allowed to be further split. In this way, the small chroma intra CBs with size less than 16 chroma samples or with size 2×N are removed. In addition, chroma scaling is not applied in case of a non-inter SCIPU. Here, no additional syntax is signaled, and whether a SCIPU is non-inter can be derived by the prediction mode of the first luma CB in the SCIPU. The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one flag before parsing the CUs in the SCIPU.

For the dual tree in intra picture, the 2×N intra chroma blocks are removed by disabling vertical binary and vertical ternary splits for 4×N and 8×N chroma partitions, respectively. The small chroma blocks with sizes 2×2, 4×2, and 2×4 are also removed by partitioning restrictions.

In addition, a restriction on picture size is considered to avoid 2×2/2×4/4×2/2×N intra chroma blocks at the corner of pictures by considering the picture width and height to be multiple of max(8, MinCbSizeY).

Intra Mode Coding with 67 Intra Prediction Modes

To capture the arbitrary edge directions presented in natural video, the number of directional intra modes in VVC is extended from 33, as used in HEVC, to 65. The new directional modes not in HEVC are depicted as red dotted arrows in FIG. 8, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighboring intra modes. The following three aspects are considered to construct the MPM list:
 Default intra modes
 Neighboring intra modes
 Derived intra modes.

A unified 6-MPM list is used for intra blocks irrespective of whether MRL and ISP coding tools are applied or not. The MPM list is constructed based on intra modes of the left and above neighboring block. Suppose the mode of the left is denoted as Left and the mode of the above block is denoted as Above, the unified MPM list is constructed as follows:
 When a neighboring block is not available, its intra mode is set to Planar by default.
 If both modes Left and Above are non-angular modes:
  MPM list→{Planar, DC, V, H, V−4, V+4}
 If one of modes Left and Above is angular mode, and the other is non-angular:
  Set a mode Max as the larger mode in Left and Above
  MPM list→{Planar, Max, DC, Max−1, Max+1, Max−2}
 If Left and Above are both angular and they are different:
  Set a mode Max as the larger mode in Left and Above
  if the difference of mode Left and Above is in the range of 2 to 62, inclusive
   MPM list→{Planar, Left, Above, DC, Max−1, Max+1}
  Otherwise
   MPM list→{Planar, Left, Above, DC, Max−2, Max+2}
 If Left and Above are both angular and they are the same:
  MPM list→{Planar, Left, Left−1, Left+1, DC, Left −2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signaled using the original mode indexes, which are remapped to the indexes of wide angular modes after parsing. The total number of intra prediction modes is unchanged, i.e., 67, and the intra mode coding method is unchanged.

To support these prediction directions, the top reference with length 2W+1, and the left reference with length 2H+1, are defined as shown in FIG. 9A and FIG. 9B respectively.

The number of replaced modes in wide-angular direction mode depends on the aspect ratio of a block. The replaced intra prediction modes are illustrated in Table 2.

TABLE 2

| Intra prediction modes replaced by wide-angular modes | |
|---|---|
| Aspect ratio | Replaced intra prediction modes |
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |
| W/H == ⅛ | Modes 55, 56 |
| W/H == 1/16 | Modes 53, 54, 55, 56 |

As shown in FIG. 10, two vertically-adjacent predicted samples (samples 1010 and 1012) may use two non-adjacent reference samples (samples 1020 and 1022) in the case of wide-angle intra prediction. Hence, low-pass reference samples filter and side smoothing are applied to the wide-angle prediction to reduce the negative effect of the increased gap $\Delta p_\alpha$. If a wide-angle mode represents a non-fractional offset. There are 8 modes in the wide-angle modes satisfy this condition, which are [−14, −12, −10, −6, 72, 76, 78, 80]. When a block is predicted by these modes, the samples in the reference buffer are directly copied without applying any interpolation. With this modification, the number of samples needed to be smoothing is reduced. Besides, it aligns the design of non-fractional modes in the conventional prediction modes and wide-angle modes.

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

Mode Dependent Intra Smoothing (MDIS)

Four-tap intra interpolation filters are utilized to improve the directional intra prediction accuracy. In HEVC, a two-tap linear interpolation filter has been used to generate the intra prediction block in the directional prediction modes (i.e., excluding Planar and DC predictors). In VVC, simplified 6-bit 4-tap Gaussian interpolation filter is used for only directional intra modes. Non-directional intra prediction process is unmodified. The selection of the 4-tap filters is performed according to the MDIS condition for directional intra prediction modes that provide non-fractional displacements, i.e. to all the directional modes excluding the following modes: 2, HOR_IDX, DIA_IDX, VER_IDX, 66.

Depending on the intra prediction mode, the following reference samples processing is performed:

The directional intra-prediction mode is classified into one of the following groups:
vertical or horizontal modes (HOR_IDX, VER_IDX),
diagonal modes that represent angles which are multiple of 45° (2, DIA_IDX, VDIA_IDX),
remaining directional modes;

If the directional intra-prediction mode is classified as belonging to group A, then then no filters are applied to reference samples to generate predicted samples;

Otherwise, if a mode falls into group B, then a [1, 2, 1] reference sample filter may be applied (depending on the MDIS condition) to reference samples to further copy these filtered values into an intra predictor according to the selected direction, but no interpolation filters are applied;

Otherwise, if a mode is classified as belonging to group C, then only an intra reference sample interpolation filter is applied to reference samples to generate a predicted sample that falls into a fractional or integer position between reference samples according to a selected direction (no reference sample filtering is performed).

Cross-Component Linear Model (CCLM) Prediction

To reduce the cross-component redundancy, a cross-component linear model (CCLM) prediction mode is used in the VVC, for which the chroma samples are predicted based on the reconstructed luma samples of the same CU by using a linear model as follows:

$$\text{pred}_C(i,j) = \alpha \cdot \text{rec}_L'(i,j) + \beta \quad (1)$$

where $\text{pred}_C(i,j)$ represents the predicted chroma samples in a CU and $\text{rec}_L(i,j)$ represents the downsampled reconstructed luma samples of the same CU.

The CCLM parameters ($\alpha$ and $\beta$) are derived with at most four neighboring chroma samples and their corresponding down-sampled luma samples. Suppose the current chroma block dimensions are W×H, then W' and H' are set as W'=W, H'=H when LM mode is applied;
W'=W+H when LM-A mode is applied;
H'=H+W when LM-L mode is applied;

The above neighboring positions are denoted as S[0, −1] . . . S[W'−1, −1] and the left neighboring positions are denoted as S[−1, 0] . . . S[−1, H'−1]. Then the four samples are selected as S[W'/4, −1], S[3*W'/4, −1], S[−1, H'/4], S[−1, 3*H'/4] when LM mode is applied and both above and left neighboring samples are available;
S[W'/8, −1], S[3*W'/8, −1], S[5*W'/8, −1], S[7*W'/8, −1] when LM-A mode is applied or only the above neighboring samples are available;
S[−1, H'/8], S[−1, 3*H'/8], S[−1, 5*H'/8], S[−1, 7*H'/8] when LM-L mode is applied or only the left neighboring samples are available;

The four neighboring luma samples at the selected positions are down-sampled and compared four times to find two smaller values: $x^0_A$ and $x^1_A$, and two larger values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$Xa = (x0A + x1A + 1) >> 1;$$

$$Xb = (x0B + x1B + 1) >> 1;$$

$$Ya = (y0A + y1A + 1) >> 1;$$

$$Yb = (y0B + y1B + 1) >> 1 \quad (2)$$

Finally, the linear model parameters $\alpha$ and $\beta$ are obtained according to the following equations.

$$\alpha = \frac{Y_a - Y_b}{X_a - X_b} \quad (3)$$

$$\beta = Y_b - \alpha \cdot X_b \quad (4)$$

FIG. 11 shows an example of the location of the left and above samples and the sample of the current block involved in the CCLM mode. FIG. 11 shows the relative sample locations of N×N chroma block 1110, the corresponding 2N×2N luma block 1120 and their neighboring samples (shown as filled circles).

The division operation to calculate parameter $\alpha$ is implemented with a look-up table. To reduce the memory required for storing the table, the diff value (difference between maximum and minimum values) and the parameter $\alpha$ are expressed by an exponential notation. For example, diff is approximated with a 4-bit significant part and an exponent. Consequently, the table for 1/diff is reduced into 16 elements for 16 values of the significand as follows:

$$\text{DivTable[ ]} = \{0, 7, 6, 5, 5, 4, 4, 3, 3, 2, 2, 1, 1, 1, 1, 0\} \quad (5)$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A mode, only the above template is used to calculate the linear model coefficients. To get more samples, the above template is extended to (W+H). In LM_L mode, only left template are used to calculate the linear model coefficients. To get more samples, the left template is extended to (H+W).

For a non-square block, the above template is extended to W+W, the left template are extended to H+H.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec_L'(i,j)=[rec_L(2i-1,2j-1)+2 \cdot rec_L(2i-1,2j-1)+rec_L(2i+1,2j-1)+rec_L(2i-1,2j)+2 \cdot rec_L(2i,2j)+rec_L(2i+1,2j)+4]>>3 \quad (6)$$

$$Rec_L'(i,j)=rec_L(2i,2j-1)+rec_L(2i-1,2j)+4 \cdot rec_L(2i,2j)+rec_L(2i+1,2j)+rec_L(2i,2j+1)+4 \cdot >>3 \quad (7)$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the $\alpha$ and $\beta$ values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signaling and derivation process are shown in Table-3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 3

Derivation of chroma prediction mode from luma mode when cclm_is enabled

| Chroma prediction mode | Corresponding luma intra prediction mode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 4.

TABLE 4

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

In Table 4, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 4 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

Position Dependent Intra Prediction Combination

In VVC, the results of intra prediction of DC, planar and several angular modes are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x',y') is predicted using an intra prediction mode (DC, planar, angular) and a linear combination of reference samples according to the Eqn. (8) as follows:

$$pred(x',y')=(wL \times R_{-1,y'}+wT \times R_{x',-1}-wTL \times R_{-1,-1}+(64-wL-wT+wTL) \times pred(x',y')+32)>>6 \quad (6)$$

where $R_{x,-1}$, $R_{-1,y}$ represent the reference samples located at the top and left boundaries of current sample (x,y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical and clipping operation is avoided. For angular modes, PDPC scale factor is adjusted such that range check is not needed and condition on angle to enable PDPC is removed (scale>=0 is used). In addition, PDPC weight is based on 32 in all angular mode cases. The PDPC weights are dependent on prediction modes and are shown in Table 5. PDPC is applied to the block with both width and height greater than or equal to 4.

TABLE 5

Example of PDPC weights according to prediction modes

| Prediction modes | wT | wL | wTL |
|---|---|---|---|
| Diagonal top-right | 16 >> ( ( y'<<1 ) >> shift) | 16 >> ( ( x'<<1 ) >> shift) | 0 |
| Diagonal bottom-left | 16 >> ( ( y'<<1 ) >> shift ) | 16 >> ( ( x'<<1 ) >> shift ) | 0 |
| Adjacent diagonal top-right | 32 >> ( ( y'<<1 ) >> shift ) | 0 | 0 |
| Adjacent diagonal bottom-left | 0 | 32 >> ( ( x'<<1 ) >> shift ) | 0 |

FIG. 12 A-D illustrate the definition of reference samples ($R_{x,-1}$, $R_{-1,y}$, and $R_{-1,-1}$) for PDPC applied over various prediction modes, where FIG. 12A corresponds to the diagonal top-right mode, FIG. 12B corresponds to the diagonal bottom-left mode, FIG. 12C corresponds to the adjacent diagonal top-right mode and FIG. 12D corresponds to the adjacent diagonal bottom-left mode. The prediction sample pred(x', y') is located at (x', y') within the prediction block. As an example, the coordinate x of the reference sample $R_{x,-1}$ is given by: x=x'+y'+1, and the coordinate y of the reference sample $R_{-1,y}$ is similarly given by: y=x'+y'+1 for the diagonal modes. For the other annular mode, the reference samples $R_{x,-1}$ and $R_{-1,y}$ could be located in fractional sample position. In this case, the sample value of the nearest integer sample location is used.

Multiple Reference Line Intra Prediction

Multiple Reference Line (MRL) intra prediction uses more reference lines for intra prediction. In FIG. 13, an example of 4 reference lines is depicted, where the samples of segments A and F are not fetched from reconstructed neighboring samples but padded with the closest samples from segments B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line idx, which is greater than 0, only include additional reference line modes in MPM list and only signal mpm index without remaining mode. The reference line index is signaled before intra prediction modes, and Planar mode is excluded from intra prediction modes in case that a nonzero reference line index is signaled.

MRL is disabled for the first line of blocks inside a CTU to prevent using extended reference samples outside the current CTU line. Also, PDPC (Position-Dependent Prediction Combination) is disabled when an additional line is used. For MRL mode, the derivation of DC value in DC intra prediction mode for non-zero reference line indices is aligned with that of reference line index 0. MRL requires the storage of 3 neighboring luma reference lines with a CTU to generate predictions. The Cross-Component Linear Model (CCLM) tool also requires 3 neighboring luma reference lines for its down-sampling filters. The definition of MRL to use the same 3 lines is aligned with CCLM to reduce the storage requirements for decoders.

Bi-Prediction with CU-Level Weight (BCW)

In HEVC, the bi-prediction signal is generated by averaging two prediction signals obtained from two different reference pictures and/or using two different motion vectors.

In VVC, the bi-prediction mode is extended beyond simple averaging to allow weighted averaging of the two prediction signals.

$$P_{bi\text{-}pred}=((8-w)*P_0+w*P_1+4)>>3 \qquad (9)$$

Five weights are allowed in the weighted averaging bi-prediction, w∈{−2, 3, 4, 5, 10}. For each bi-predicted CU, the weight w is determined in one of two ways: 1) for a non-merge CU, the weight index is signaled after the motion vector difference; 2) for a merge CU, the weight index is inferred from neighboring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights (w∈{3, 4, 5}) are used.

At the encoder, fast search algorithms are applied to find the weight index without significantly increasing the encoder complexity. These algorithms are summarized as follows. For further details can be found in the VTM software and document JVET-L0646 (Yu-Chi Su, et. al., "CE4-related: Generalized bi-prediction improvements combined from JVET-L0197 and JVET-L0296", Joint Video Experts Team (JVET) of ITU-T SG 16 WP 3 and ISO/IEC JTC 1/SC 29, 12th Meeting: Macao, CN, 3-12 Oct. 2018, Document: JVET-L0646). When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signaled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signaled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signaled, and w is inferred to be 4 (i.e. equal weight is applied). For a merge CU, the weight index is inferred from neighboring blocks based on the merge candidate index. This can be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIIP mode, the BCW index of the current CU is set to 2, e.g. equal weight.

Joint Video Expert Team (JVET) of ITU-T SG16 WP3 and ISO/IEC JTC1/SC29/WG11 are currently in the process of exploring the next-generation video coding standard. Some promising new coding tools have been adopted into Enhanced Compression Model 2 (ECM 2) (M. Coban, et al., "Algorithm description of Enhanced Compression Model 2 (ECM 2)," Joint Video Expert Team (JVET) of ITU-T SG 16 WP 3 and ISO/IEC JTC 1/SC 29, 23rd Meeting, by teleconference, 7-16 Jul. 2021, Doc. JVET-W2025) to further improve VVC. The adopted new tools have been implemented in the reference software ECM-2.0 (ECM reference software ECM-2.0, available at https://vcgit.hhi.fraunhofer.de/ecm/ECM [Online]). Particularly, a new method for jointly predicting a collection of signs of transform coefficient levels in a residual transform block has been developed (JVET-D0031, Felix Henry, et al., "Residual Coefficient Sign Prediction", Joint Video Expert Team (JVET) of ITU-T SG 16 WP 3 and ISO/IEC JTC 1/SC 29, 4th Meeting: Chengdu, CN, 15-21 Oct. 2016, Doc. JVET-D0031). In ECM 2, to derive a best sign prediction hypothesis for a residual transform block, a cost function is defined as discontinuity measure across block boundaries shown on FIG. 14, where block 1410 corresponds to a transform block, circles 1420 and 1422 correspond to neighboring samples and circles 1430 and 1432 correspond to reconstructed samples associated with sign candidates of block 1410. The cost function is defined as a sum of absolute second derivatives in the residual domain for the above row and left column as follows:

$$\text{cost} = \Sigma_{x=0}^{w-1} |(-R_{x,-2} + 2R_{x,-1} - P_{x,0}) - r_{x,0}| + \Sigma_{y=0}^{h-1} |(-R_{-2,y} + 2R_{-1,y} - P_{0,y}) - r_{0,y}| \quad (10)$$

In the above equation, R is reconstructed neighbors, P is prediction of the current block, and r is the residual hypothesis. The allowed maximum number of the predicted signs $N_{sp}$ for each sign prediction hypothesis in a transform block is signaled in the sequence parameter set (SPS) and is constrained to be less than or equal to 8 in ECM-2.0. The cost function is measured for all hypotheses, and the one with the smallest cost is selected as a predictor for coefficient signs. Only signs of coefficients from the top-left 4×4 transform subblock region (with lowest frequency coefficients) in a transform block are allowed to be included into the hypothesis. The signs of first $N_{sp}$ non-zero coefficients (if available) are collected and coded according to a raster-scan order over the top-left 4×4 subblock. For those predicted coefficients, instead of the coefficient sign, a sign prediction bin indicating whether the predicted sign is equal to the selected hypothesis is signaled. This sign prediction bin is context coded, where the selected context is derived from whether a coefficient is DC or not. The contexts are separated for intra and inter blocks, and for luma and chroma components. For those other coefficients without sign prediction, the corresponding signs are coded by CABAC in the bypass mode.

Joint Coding of Chroma Residuals

VVC supports the joint coding of chroma residual (JCCR) tool, where the chroma residuals are coded jointly. The usage (activation) of the JCCR mode is indicated by a TU-level flag tu_joint_cbcr_residual_flag and the selected mode is implicitly indicated by the chroma CBFs. The flag tu_joint_cbcr_residual_flag is present if either or both chroma CBFs for a TU are equal to 1. In the PPS (Picture Parameter Set) and slice header, chroma QP offset values are signaled for the JCCR mode to differentiate from the usual chroma QP offset values signaled for regular chroma residual coding mode. These chroma QP offset values are used to derive the chroma QP values for some blocks coded using the JCCR mode. The JCCR mode has 3 sub-modes. When a corresponding JCCR sub-mode (sub-mode 2 in Table 1) is active in a TU, this chroma QP offset is added to the applied luma-derived chroma QP during quantization and decoding of that TU. For the other JCCR sub-modes (sub-modes 1 and 3 in Table 6), the chroma QPs are derived in the same way as for conventional Cb or Cr blocks. The reconstruction process of the chroma residuals (resCb and resCr) from the transmitted transform blocks is depicted in Table 1. When the JCCR mode is activated, one single joint chroma residual block (resJointC[x][y] in Table 1) is signaled, and residual block for Cb (resCb) and residual block for Cr (resCr) are derived considering information such as tu_cbf_cb, tu_cbf_cr, and CSign, which is a sign value specified in the slice header.

At the encoder side, the joint chroma components are derived as explained in the following. Depending on the mode (listed in the tables above), resJointC{1, 2} are generated by the encoder as follows:

If mode is equal to 2 (single residual with reconstruction Cb=C, Cr=CSign*C), the joint residual is determined according to resJointC[x][y]=(resCb[x][y]+CSign*resCr[x][y])/2

Otherwise, if mode is equal to 1 (single residual with reconstruction Cb=C, Cr=(CSign*C)/2), the joint residual is determined according to resJointC[x][y]=(4*resCb[x][y]+2*CSign*resCr[x][y])/5

Otherwise (mode is equal to 3, i. e., single residual, reconstruction Cr=C, Cb=(CSign*C)/2), the joint residual is determined according to resJointC[x][y]=(4*resCr[x][y]+2*CSign*resCb[x][y])/5

TABLE 6

Reconstruction of chroma residuals. The value CSign is a sign value (+1 or −1), which is specified in the slice header, resJointC[ ][ ] is the transmitted residual.

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ] ) >> 1<br>resCr[ x ][ y ] = resJointC[ x ][ y ] | 3 |

The three joint chroma coding sub-modes described above are only supported in I slices. In P and B slices, only mode 2 is supported. Hence, in P and B slices, the syntax element tu_joint_cbcr_residual_flag is only present if both chroma cbfs are 1.

The JCCR mode can be combined with the chroma transform skip (TS) mode (more details of the TS mode can be found in Section 3.9.3 of JVET-T2002. To speed up the encoder decision, the JCCR transform selection depends on whether the independent coding of Cb and Cr components selects the DCT-2 or the TS as the best transform, and whether there are non-zero coefficients in independent chroma coding. Specifically, if one chroma component selects DCT-2 (or TS) and the other component is all zero, or both chroma components select DCT-2 (or TS), then only DCT-2 (or TS) will be considered in JCCR encoding. Otherwise, if one component selects DCT-2 and the other selects TS, then both, DCT-2 and TS, will be considered in JCCR encoding.

BRIEF SUMMARY OF THE INVENTION

A method and apparatus for video coding are disclosed. According to the method, input data associated with a current block are received, wherein the input data comprise pixel data for the current block to be encoded at an encoder side or encoded data associated with the current block to be decoded at a decoder side. A set of candidates associated with coding modes or mode parameters are determined. Boundary matching costs associated with the set of candidates are determined, where each of the boundary matching costs is determined, for one target candidate of the set of candidates, by using reconstructed or predicted samples of the current block determined according to said one target candidate and neighboring reconstructed or predicted samples of one or more neighboring blocks of the current block. Each of the boundary matching costs is calculated using one target configuration selected from a plurality of configurations. A final candidate is selected from the set of candidates based on the boundary matching costs. The current block is encoded or decoded using the final candidate.

In one embodiment, at least one of the plurality configurations excludes, for said determining boundary matching costs, top-side pixels or left-side pixels of the current block and corresponding top-side pixels or corresponding left-side pixels of said one or more neighboring blocks. In one embodiment, said at least one of the plurality configurations depends on at least two motion vectors of the current block and said one or more neighboring blocks. In one embodiment, at least one of the plurality configurations only includes, for said determining boundary matching costs, top-side pixels or left-side pixels of the current block and corresponding top-side pixels or corresponding left-side pixels of said one or more neighboring blocks. For example, the top-side pixels or the left-side pixels of the current block and the corresponding top-side pixels or the corresponding left-side pixels of said one or more neighboring blocks can be excluded if one or more motion vector differences between the current block and said one or more neighboring blocks exceed a threshold on a corresponding top side or a corresponding left side. In one embodiment, similarity or differences of said one or more motion vectors of the current block and said at least two neighboring blocks are determined on a pixel-wise, subblock-wise, or block-wise basis.

In one embodiment, at least one of the plurality configurations calculates boundary matching in an angular direction other than a horizontal direction and a vertical direction. In one embodiment, one or more syntax elements associated with the angular direction is signaled in a bitstream at the encoder side or parsed from the bitstream at the decoder side. The syntax elements can be signaled in the bitstream or parsed from the bitstream in a CU (coding unit), PU (prediction unit) or CTU (coding tree unit) level. In one embodiment, the angular direction of the current block is predicted based on the angular direction of one neighboring block. In another embodiment, the angular direction of the current block is implicitly determined by analyzing context information of L-shape neighboring pixels of the current block.

In one embodiment, the set of candidates corresponds to weightings of BCW (Bi-prediction with CU-level weight). In this case, each of the boundary matching costs is determined for one weighting using the reconstructed samples of the current block derived according to said one weighting, and a weighting index is signaled at the encoder side or parsed at the decoder side for selecting a final weighting value from re-ordered weightings of BCW according to the boundary matching costs. In another embodiment, each of the boundary matching costs is determined for one weighting using the predicted samples of the current block derived according to said one weighting, and a final weighting value corresponding to a smallest boundary matching cost is selected implicitly.

In one embodiment, each of the boundary matching costs is calculated using one target configuration selected from a plurality configurations according to one or more coding contexts of the current block and/or said one or more neighboring blocks of the current block.

BRIEF DESCRIPTION OF THE DRAWINGS

FIG. 11 shows an example of the location of the left and above samples and the sample of the current block involved in the CCLM mode.

FIG. 12A-D illustrate examples of the definition of reference samples for PDPC applied over various prediction modes, where FIG. 12A corresponds to the diagonal top-right mode, FIG. 12B corresponds to the diagonal bottom-left mode, FIG. 12C corresponds to the adjacent diagonal top-right mode and FIG. 12D corresponds to the adjacent diagonal bottom-left mode.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

During the development of the current emerging international video standard, more and more coding modes have been proposed. Often, selected coding modes need to be signaled so that a decode can use the same coding modes. With the increased coding modes, it requires more data to signal syntax elements associated with the coding modes. Therefore, it is desirable to develop techniques to reduce or even eliminate the required data for signaling the associated syntax elements. The boundary matching technique used for joint sign coding of transform coefficients used in ECM2.0 illustrates a technique that both the encoder and decoder can perform the same cost evaluation based on neighboring data to select a sign combination for a smallest cost function. In the present invention, block boundary matching methods are used to improve the performance.

Additional Angles for Boundary Smoothness Measure

Figure 15:
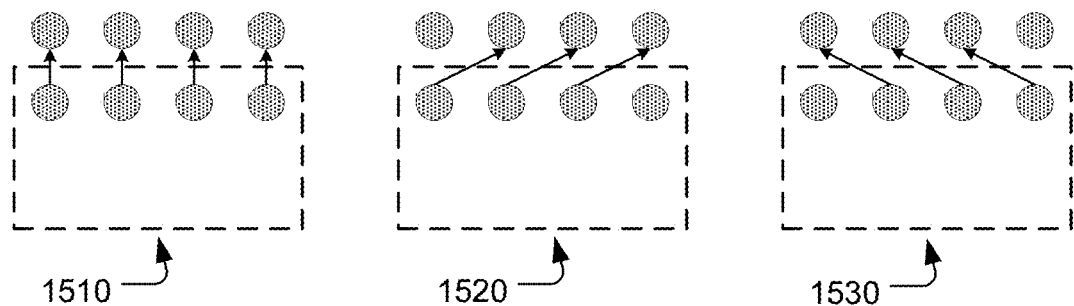
FIG. 15 shows examples of directional boundary matching including angular directions other than the horizontal and vertical directions according to one embodiment of the present invention.

Compared to the conventional boundary matching algorithm, which only includes vertical (for top) or horizontal (for left) direction matching (e.g. residual sign prediction inside ECM), in the proposed method, the boundary matching criteria not only include vertical (for top edge) and/or horizontal (for left edge), but also some other angles. As shown in FIG. 15, the traditional boundary matching compares the pixels vertically 1510; the proposed boundary matching method can compare pixels in a diagonal direction (an angle toward upper-right direction 1520 or upper-left direction 1530). For other angles, it can use filter (e.g. FIR filter) to interpolate the fractional position of pixels (for example, if the corresponding positions pointed by the angle is not an integer position of pixel)

The angle of the matching process can be explicitly signaled or implicitly derived (in decoding process).

In one embodiment, the smoothness matching angle can be explicitly signaled in CU/PU/CTU basis, it can also be predicted by neighboring CUs (for example, the smoothness matching angle of the left or top neighboring CU and the detail angle difference is signaled.)

In another embodiment, the smoothness matching angle can be implicitly decided. In one embodiment, the angle is decided by intra-mode mode (for example, in VVC, the intra coding mode has various angles, the intra-mode specified angle can be reused as the boundary smoothness matching angle). In another embodiment, the angle can be decided by context analysis for the current L-shape (current L shape is the top, left, and/or top-left pixel regions surrounding the current CU), such as the angle analysis (using angle filter) or angle histogram by some angle filters.

In another embodiment, the angle can be partially signaled and partially implicitly decided. In one example, encoder can send one coarse angle and decoder-deriving one fine-angle. The coarse angle and the derived fine-angle can be combined together to form the final angle. In another example, encoder can send one fine angle and decoder-deriving one coarse-angle.

After the angle is decided, the boundary matching can be smoothness matched (compare pixels along the direction) or gradient-value matching (compare gradient value along the direction) according to the angle.

Value Clipping During Calculating Differences

In some cases, the L-shape (of neighboring pixels surrounding the current CU) may be another object (different with the object of current CU). In this case, the boundary smoothness matching may cause loss. To solve this risk, one new method is proposed. In this method, when calculating boundary smoothness matching, it will apply clipping for the sample matching difference. The following is an example for clipping the difference. First, a minimum threshold is pre-defined and/or a maximum threshold is pre-defined. Then, a clipping process is applied to adjusting the value of difference. When performing clipping, if the difference is larger than the maximum threshold, it is set equal to the maximum threshold; if the difference is smaller than the minimum threshold, it is set equal to the minimum threshold.

In one embodiment, the clipping threshold can be fixed. In another embodiment, the clipping threshold can be signaled in CTU-level or picture-level or sequence-level. In yet another embodiment, the clipping threshold can be implicitly decided by context-analysis or histogram analysis for the current L shape and current predictor. In yet another embodiment, the clipping threshold can be implicitly decided according to original video bit-depth or the internal bit-depth in codec.

Boundary Selection Based on Similarity of Motion-Vectors

The boundary selection can be performed implicitly. Following are some examples of implicit boundary selection.

In some cases, the neighboring pixels may have discontinuity with current CU (for example, the neighbor CU is located in another object). In this case, the boundary matching method may cause loss. Therefore, one method to decide whether to trust the neighboring pixels is needed.

In this proposed method, in one embodiment, coding information is used to decide the trust neighboring pixels. Take the coding information being at least two motion vectors of the current block and one or more neighboring blocks of the current block as an example. If the MV of the neighboring MV of the side (top or left side) has large difference from the current CU MV, this side will be excluded for boundary matching. The MV for similarity (or difference) comparison can be pixel-wise (assume neighboring region and current CU region have pixel-wise MV), subblock-wise (assume neighboring region and current CU region have subblock-wise MV) or CU (block)-wise.

Figure 16:
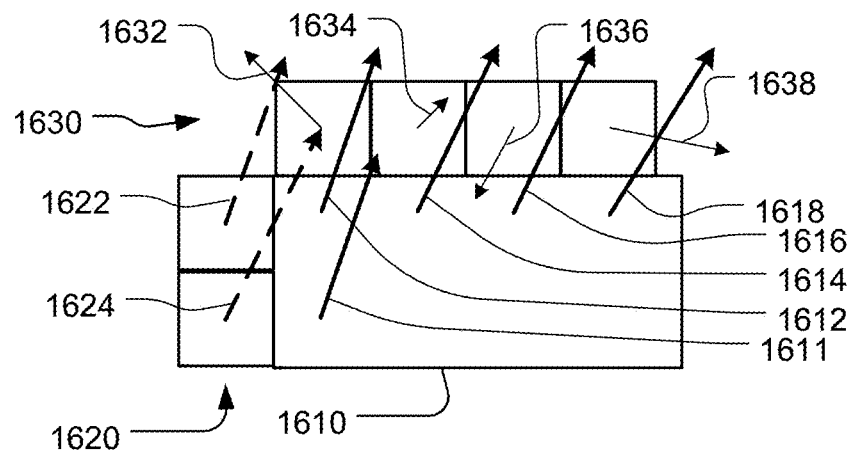
FIG. 16 shows an example of selectively excluding the top or left region for boundary matching calculation based on similarity/difference of motion vectors between the current block and one or more neighboring blocks according to one embodiment of the present invention.

One example according to this method is shown in FIG. 16, where block 1610 corresponds the current CU, boxes 1620 correspond to left neighboring subblocks and boxes 1630 correspond to top neighboring subblocks. The motion vectors of the left neighboring subblocks are labeled as 1622 and 1624. The motion vectors of the top neighboring subblocks are labeled as 1632, 1634, 1636 and 1638. The motion vectors of the current block on the left side are labelled as 1611 and 1612. The motion vectors of the current block near the top side are labelled as 1612, 1614, 1616 and 1618. As shown in FIG. 16, the motion vectors of the current block are similar to the motion vectors of the left neighboring subblocks and the motion vectors of the current block are very different from the motion vectors of the top neighboring subblocks. Accordingly, only the left boundary pixels are included in the boundary matching calculation. A threshold is predefined to measure the similarity of motion vectors. In one way, the threshold is pre-defined as one or more fixed values in the standard. In another way, the threshold is selected according to range of MV values (defined in the standard), the block width, block height, block area, coding information or context of the current block or neighboring coded blocks.

Figure 17:
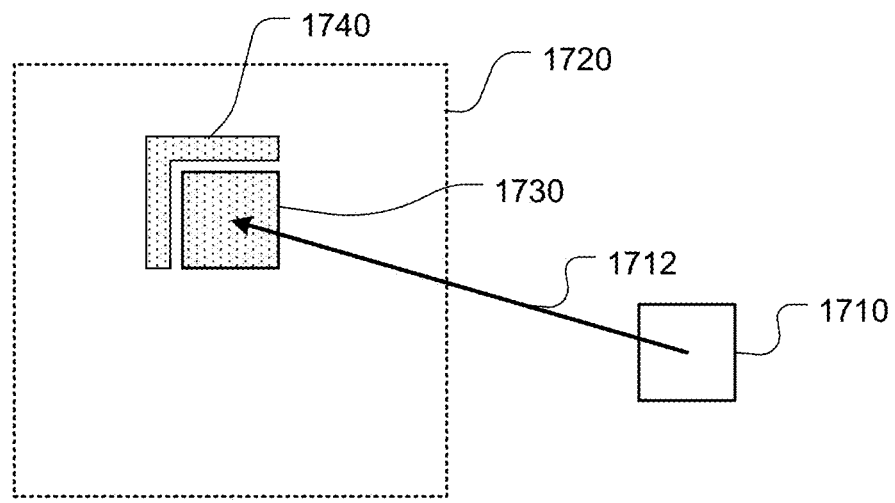
FIG. 17 shows another example of selectively excluding the top or left region for boundary matching calculation by context analysis of a reference block and its L-shape neighboring region according to one embodiment of the present invention.

In another embodiment, decoder can refer to the corresponding reference pixels (the pixels 1730 in the reference picture 1720 pointed by the current MV 1712 of the current CU 1710) and the corresponding L-shape region 1740 in the reference picture, as shown in FIG. 17. The following is an example of context analysis of the reference block and its corresponding L-shape neighboring region. If the corresponding L-shape pixels 1740 of the top or left side are very different from the reference block 1730, then it can implicitly give up (i.e., not using) the corresponding side for the current CU. For example, if the corresponding L-shape pixels of the top side are very different from the reference block, then the current block will not use the top pixels of the current L-shape for matching.

Considering Cb and Cr Block Boundaries at the Same Time, when JCCR is Enabled

In ECM 2.0, there is one coding tool of sign prediction method (by boundary matching), in JCCR case, the boundary matching is only applied for one fixed color component (for example, fixed to compare the boundary matching for Cb)

In this method, when doing sign prediction for residual by boundary matching for JCCR case, it is proposed to consider Cb and Cr block boundaries at the same time.

In one embodiment, both Cb pixels and Cr pixels are boundary matched, and the total distortion is used to decide the residual sign bits.

In another embodiment, the Cb boundary matching result and Cr boundary matching result are weighted for deciding the residual sign bits.

In another embodiment, encoder can send a signal to inform the decoder to select Cb-boundary-matching or Cr-boundary-matching.

In another embodiment, the weighting (weighted summation for the matching cost) for the Cb-boundary-matching and the Cr-boundary-matching depends on the JCCR mode. For one example, if in the certain JCCR mode, the Cb is more important than Cr, then the Cb-boundary-matching will be more important in the weighted summation.

In another sub-embodiment, it depends on the difference between current predictor and neighboring reconstructed pixel. For example, if the difference between current predictor and neighboring reconstructed pixel for Cb is much larger than that for Cr, then it has higher weighting for Cb boundary matching (or, in another example, skipping Cr boundary matching).

Check or Subsampling Based on Horizontal Boundary Only

In this method, to reduce complexity for the boundary matching, the boundary matching can be based on the horizontal boundary only. In the case that the multiple transform kernel with N different transform kernels can be implicitly selected by the boundary matching, the decoder will generate N different versions of inverse transform and add back onto predictor to make N different versions of reconstruction. Then, the decoder will use the kernel to achieve the smallest boundary matching cost. Accordingly, coding gain can be achieved without the need for extra signaling related to the multiple kernel selection. At the decoder, conventionally the vertical inverse transform is firstly performed and then the horizontal inverse transform. According to the present invention, only the horizontal boundary check is performed for the boundary matching. In theory, we only need to generate the leftmost column of samples for inverse horizontal transform. Therefore, the complexity for boundary matching computation is substantially reduced.

Another method to save the complexity for the multiple kernel selection is to subsample the matching sample. Therefore, there is no need to generate all inverse transform samples according to this embodiment.

Enhancement of L-Shape

In this method, to improve the current L-shape pixels in order to improve the coding gain of boundary-matching method, some embodiments are proposed as follows.

According to one embodiment, it is proposed to do noise reduction for the boundary pixels for better boundary matching quality. The boundary matching process will be applied after the noise reduction processing.

In another embodiment, it is proposed to do some MH (multi-hypothesis) blending (e.g. using L-shapes of two other MH blocks to slightly adjust the current L-shape), For example, it will use one or more MVs and fetch the corresponding L-shape pixels from the reference picture (pointed by MV) to do some blending, the resulting L-shape pixels will be better for boundary matching.

Selective Boundary Region for Matching

The main purpose of this proposed method is to avoid incorrect boundary pixels for matching and, moreover, this method is region based (not using entire top edge or left edge, but only partial region(s) of the top or left neighbor pixels).

In one embodiment, if the neighbor MVs (e.g. subblock units) are largely different from the current MVs for some regions, then it will give up this region of boundary pixels for matching.

In another embodiment, it can use segmentation based method to do the analysis for the L-shape region. In other words, the neighboring L shape will be segmented and judged based on the object shape of the L-shape according to this embodiment. Then, it can avoid the boundary matching from a different object by excluding the corresponding region(s) for boundary matching

Adaptive Number of Lines for Computing Smoothness

In this proposed method, the number of lines for boundary smoothness calculation is adaptively changed. In one example, it may use more or less lines of neighboring boundary to compute the boundary smoothness depending on some size conditions, content conditions and so on. The boundary smoothness calculation may correspond to the pixel smoothness, gradient smoothness, or angle smoothness.

In one embodiment, for larger CUs, it will use more lines for the boundary matching.

In another embodiment, for smaller CUs, it will use less lines for the boundary matching.

In yet another embodiment, for narrow CUs, it will use more lines for shorter edge for the boundary matching. For low-texture CUs, it will use more lines.

In yet another embodiment, for high-texture CUs surrounding pixels where the top and/or left neighboring pixels have a high degree of texture, it will use less lines for the boundary matching

BCW Weighting Selection with Predictor-Only Implicit Selection or Syntax Reorder The boundary matching can also be applied for BCW weighting selection to save BCW weighting syntax bitrate. For example, we can generate the predictor with different assumptions of BCW weighting at the decoder side, the different weighting assumption results are added to the residual to make different assumption versions of reconstruction blocks. The boundary matching is then applied for those different versions of reconstruction blocks, so as to select the best one for the BCW weighting decision in the decoder side.

Beside the previous method, other embodiments for the BCW weighting syntax saving based on boundary matching are disclosed as follows.

In one embodiment, the BCW weighting values are sorted according to the matching cost for different versions of reconstruction blocks. The reordered index sent by the encoder is then used to select the final BCW weighting value from the sorted list of weighting values.

In another embodiment, we do not add different versions of predictors to the residual. Instead, different versions of predictors corresponding to the different assumptions of weighting values are directly compared with the reconstruction neighboring pixels of the neighboring L shape to determine the smallest one for the decoder-derived weighting.

Figure 1A:
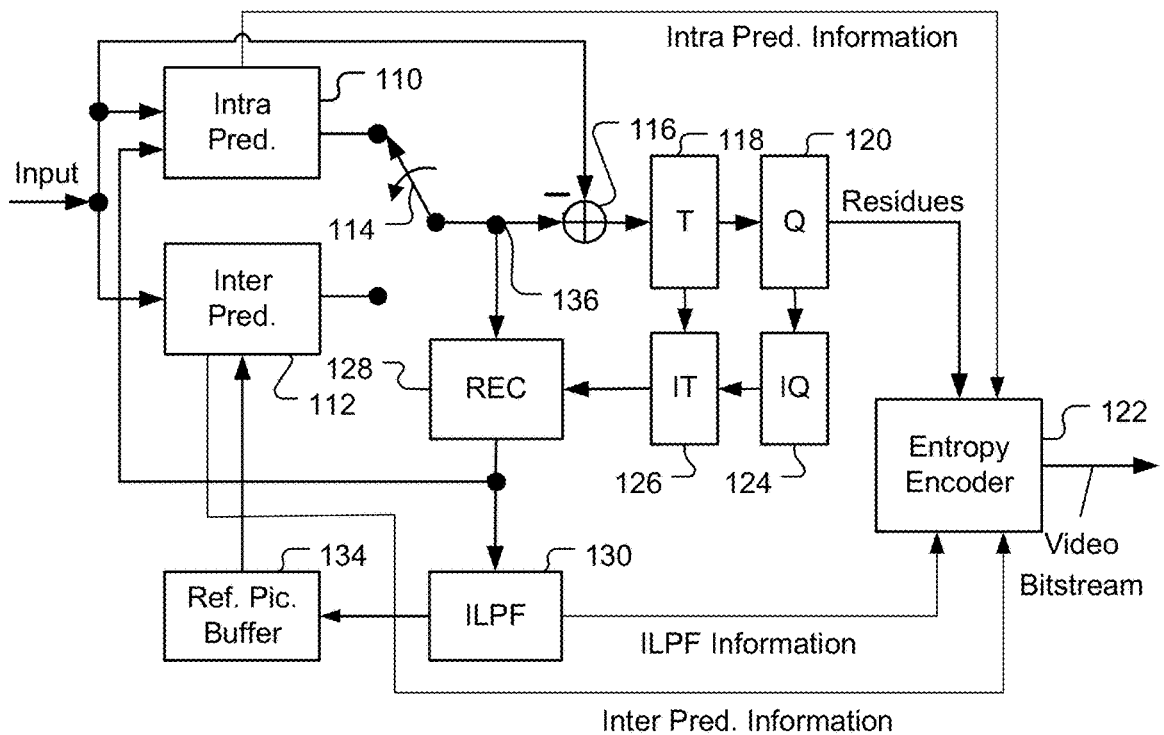
FIG. 1A illustrates an exemplary adaptive Inter/Intra video coding system incorporating loop processing.
Figure 1B:
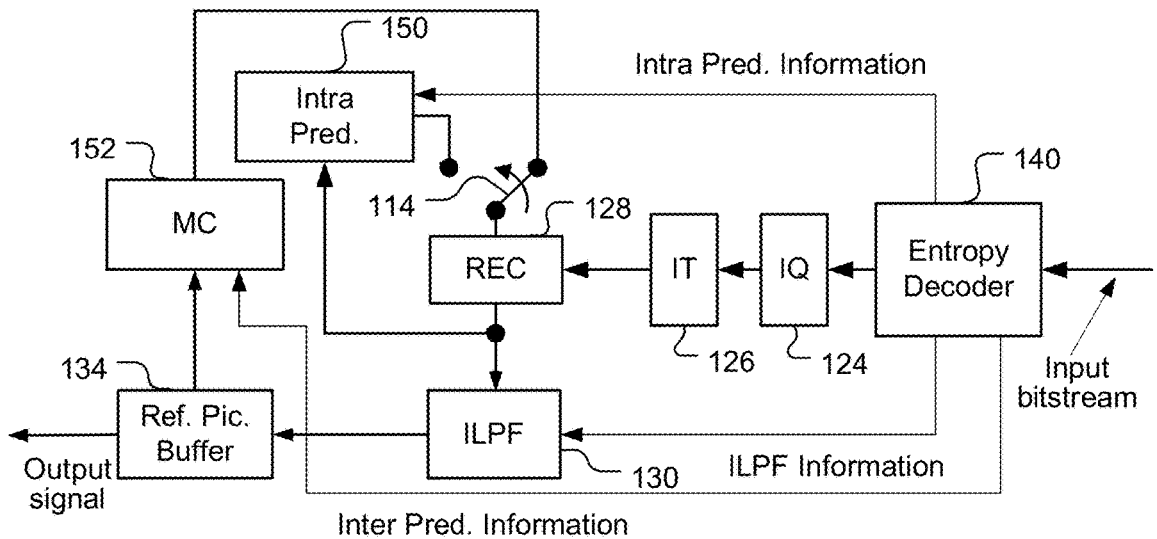
FIG. 1B illustrates a corresponding decoder for the encoder in FIG. 1A.
Figure 2:
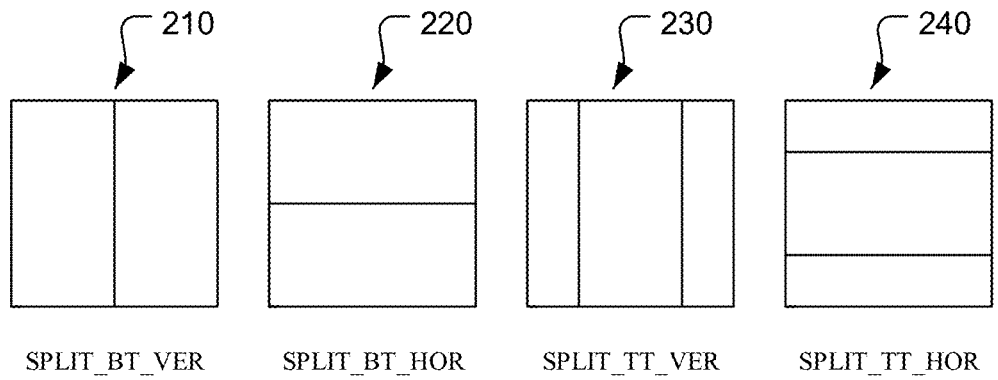
FIG. 2 illustrates examples of a multi-type tree structure corresponding to vertical binary splitting (SPLIT_BT_VER), horizontal binary splitting (SP- LIT_BT_HOR), vertical ternary splitting (SPLIT_TT_VER), and horizontal ternary splitting (SPLIT_TT_HOR).
Figure 3:
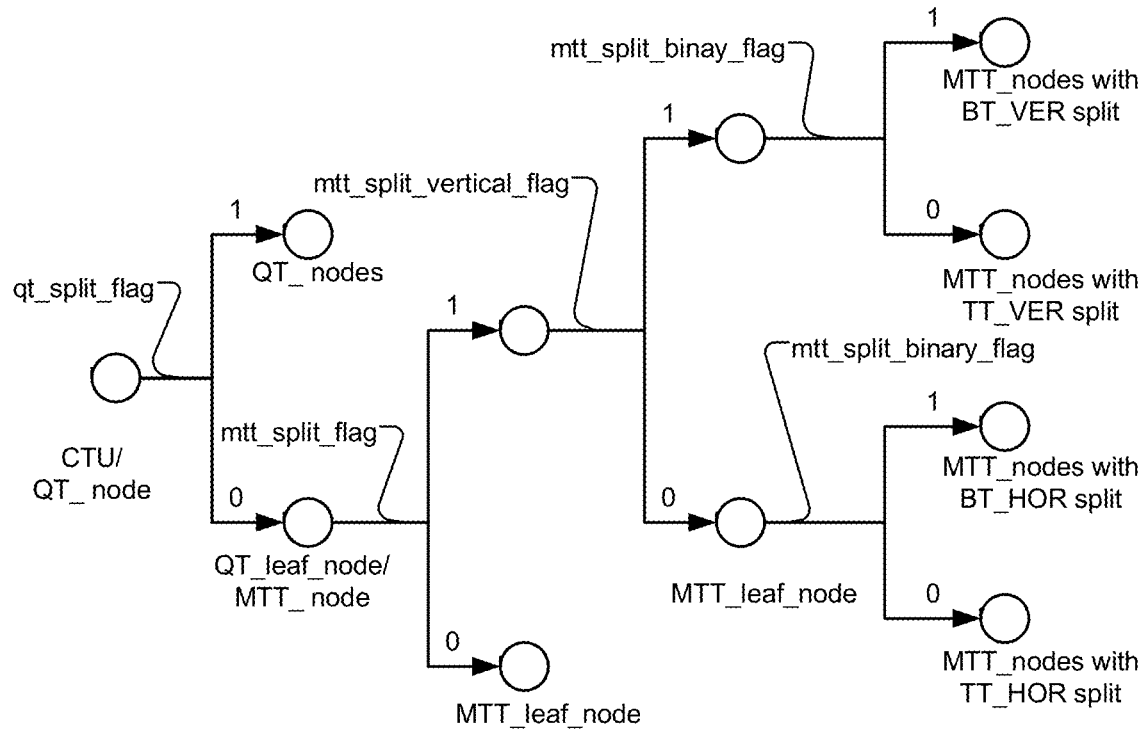
FIG. 3 illustrates an example of the signaling mechanism of the partition splitting information in quadtree with nested multi-type tree coding tree structure.
Figure 4:
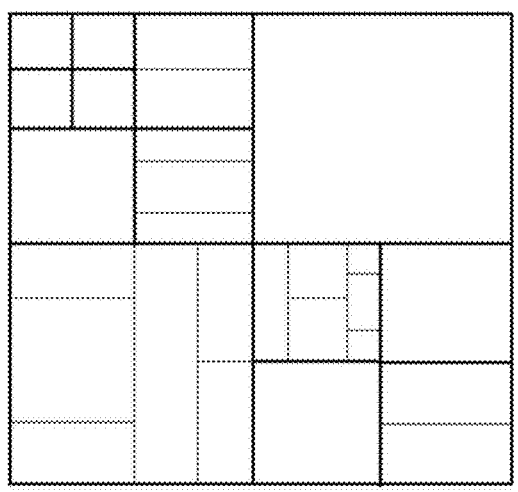
FIG. 4 shows an example of a CTU divided into multiple CUs with a quadtree and nested multi-type tree coding block structure, where the bold block edges represent quadtree partitioning and the remaining edges represent multi-type tree partitioning.
Figure 5:
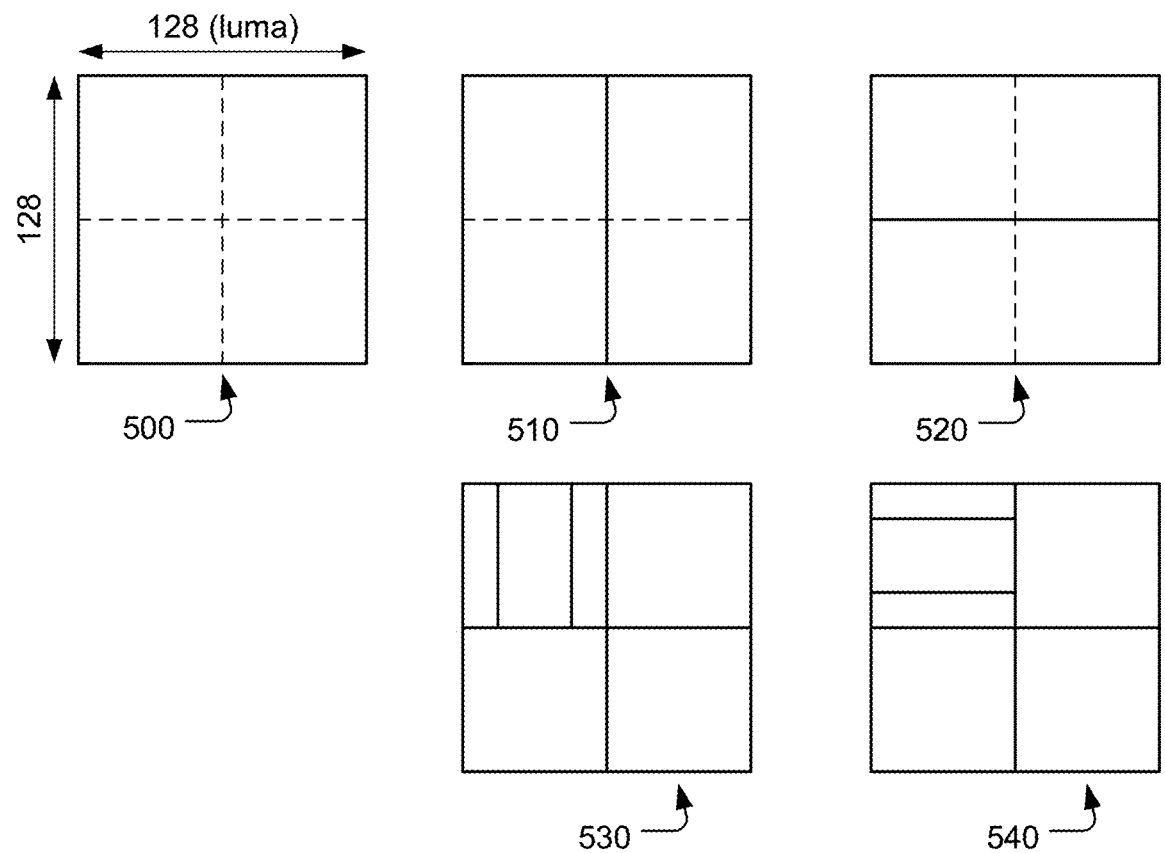
FIG. 5 shows an example of TT split forbidden when either width or height of a luma coding block is larger than 64.
Figure 6:
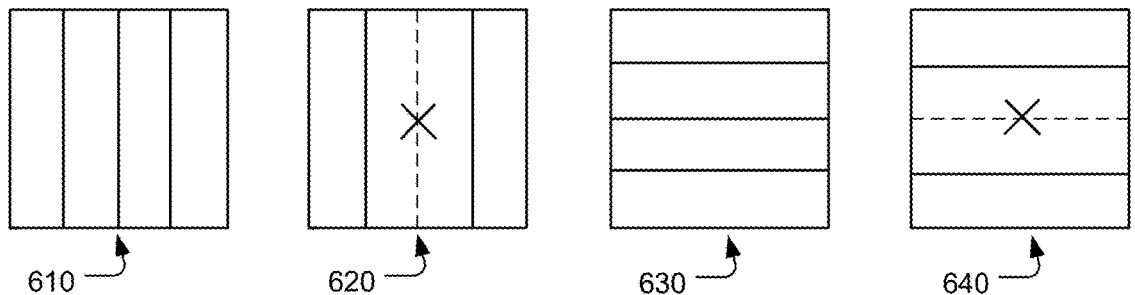
FIG. 6 illustrates an example of the redundant splitting patterns of binary tree splits and ternary tree splits.
Figure 7:
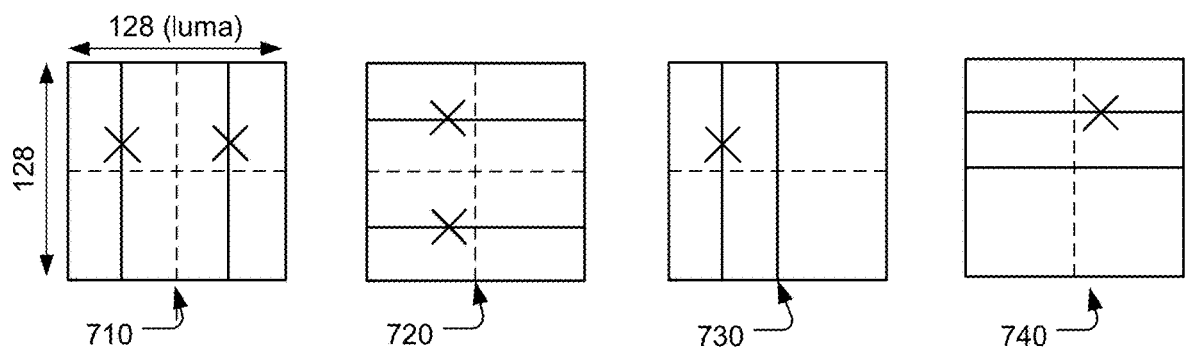
FIG. 7 shows some examples of TT split forbidden when either width or height of a luma coding block is larger than 64.
Figure 7:
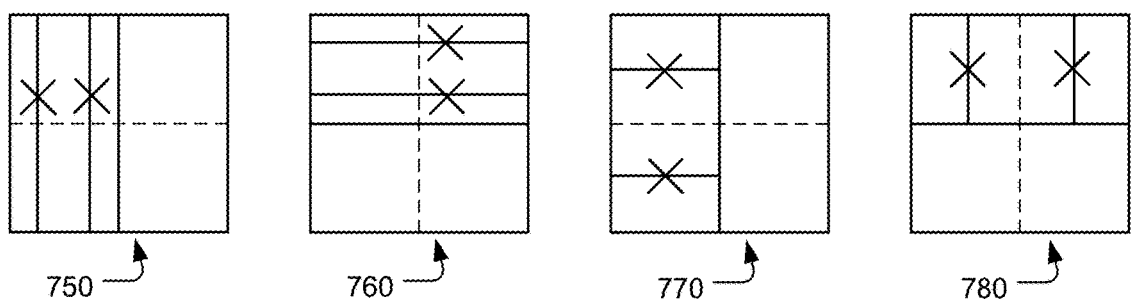
Figure 8:
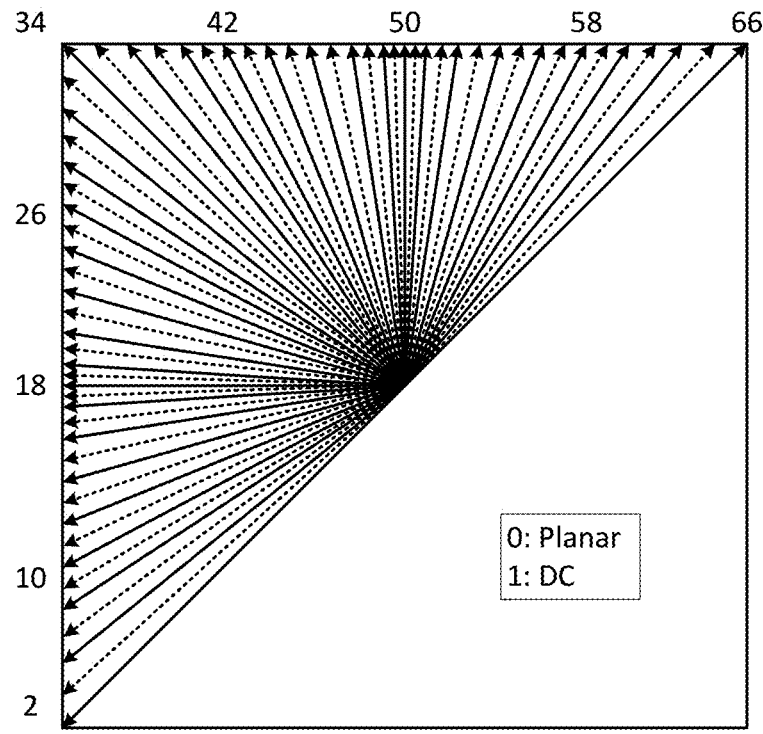
FIG. 8 shows the intra prediction modes as adopted by the VVC video coding standard.
Figure 9A:
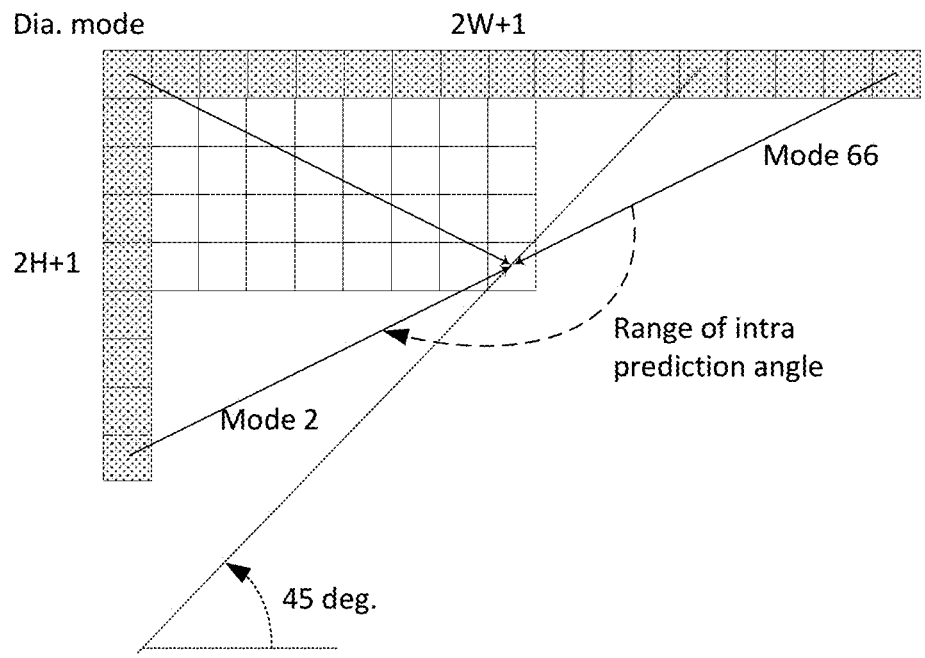
FIGS. 9A-B illustrate examples of wide-angle intra prediction a block with width larger than height (FIG. 9A) and a block with height larger than width (FIG. 9B).
Figure 9B:
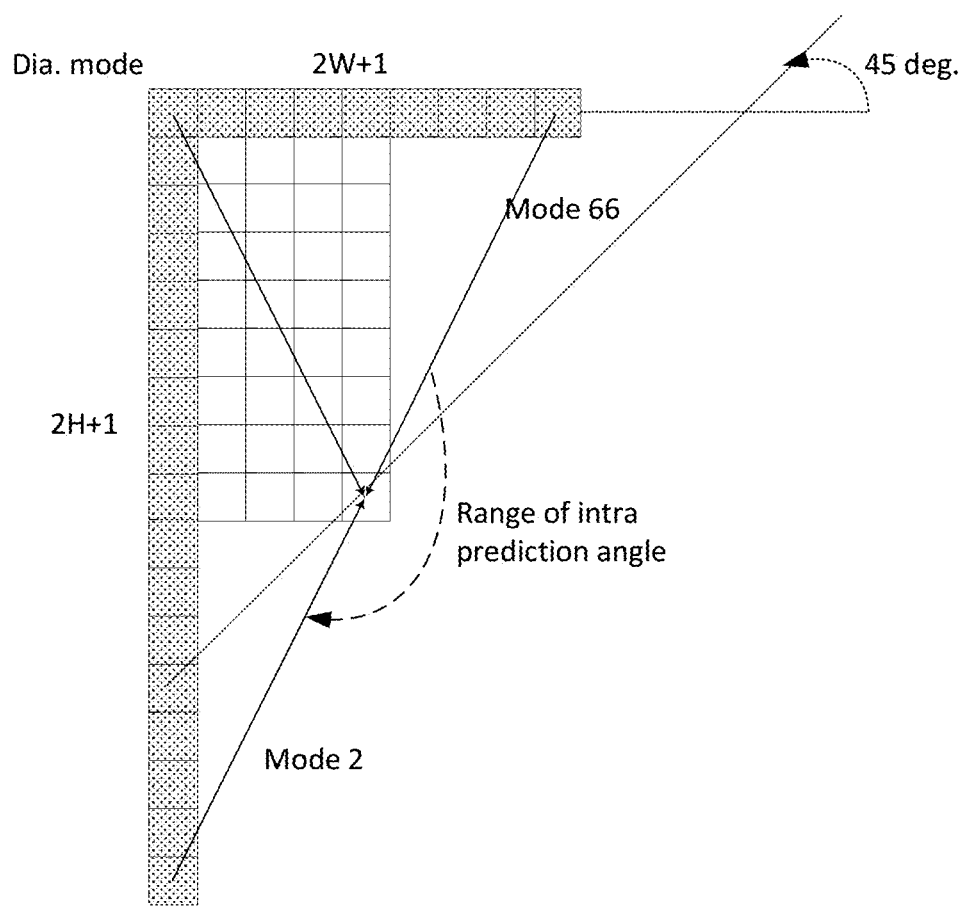
Figure 10:
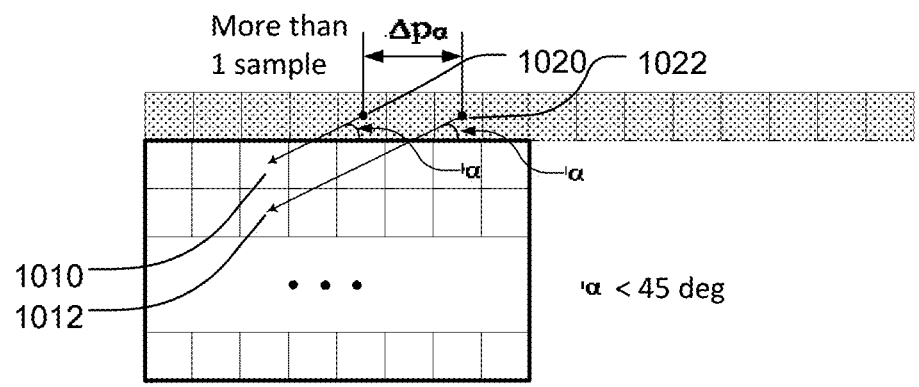
FIG. 10 illustrate examples of two vertically-adjacent predicted samples using two non-adjacent reference samples in the case of wide-angle intra prediction.
Figure 12C:
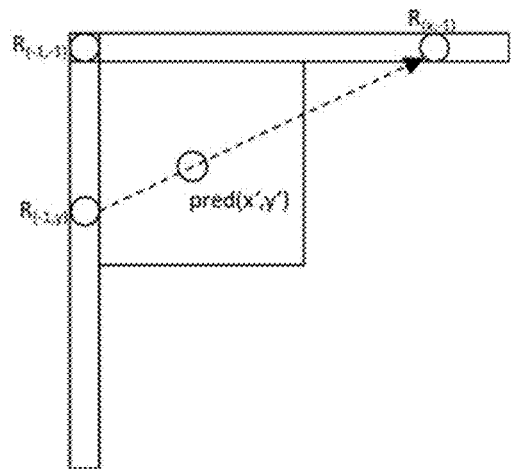
Figure 12D:
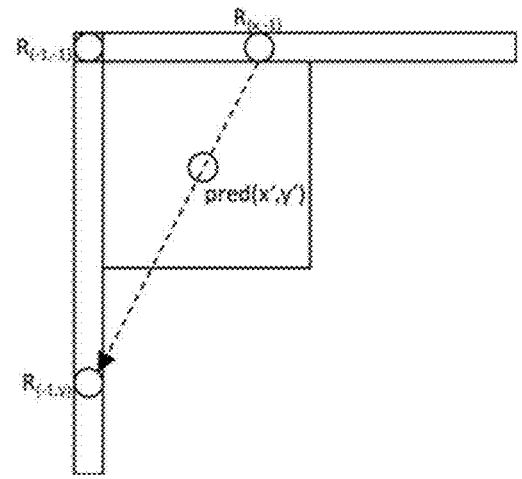
Figure 13:
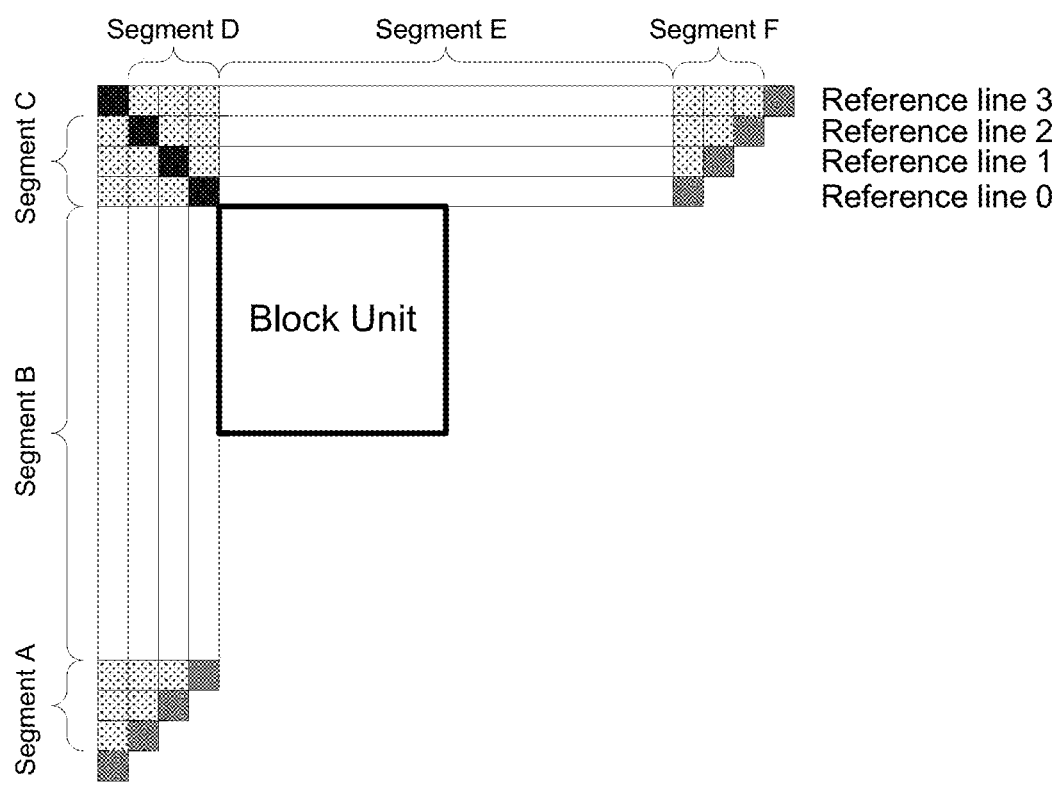
FIG. 13 shows an example of multiple reference line (MRL) intra prediction uses more reference lines for intra prediction.
Figure 14:
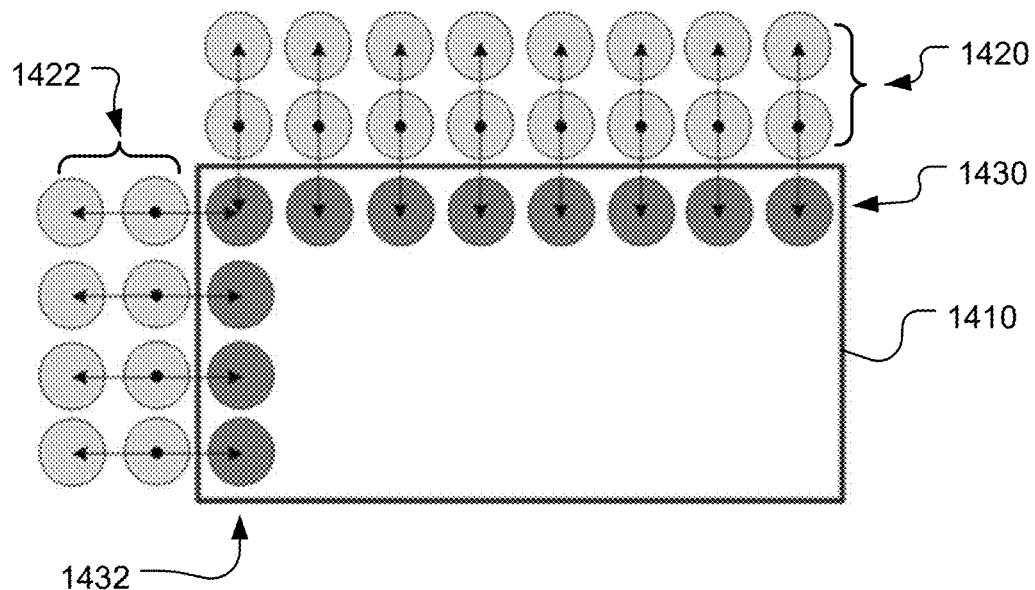
FIG. 14 shows an example of boundary pixels involved in the boundary matching cost calculation.

Any of the foregoing proposed methods can be implemented in encoders and/or decoders. For example, any of the proposed methods can be implemented in an intra (e.g. Intra 150 in FIG. 1B)/inter coding module of a decoder, a motion compensation module (e.g. MC 152 in FIG. 1B), a merge candidate derivation module of a decoder. Alternatively, any of the proposed methods can be implemented as a circuit coupled to the intra (e.g. Intra 110 in FIG. 1A)/inter coding module of an encoder and/or motion compensation module (e.g. MC 112 in FIG. 1B), a merge candidate derivation module of the encoder.

Figure 18:
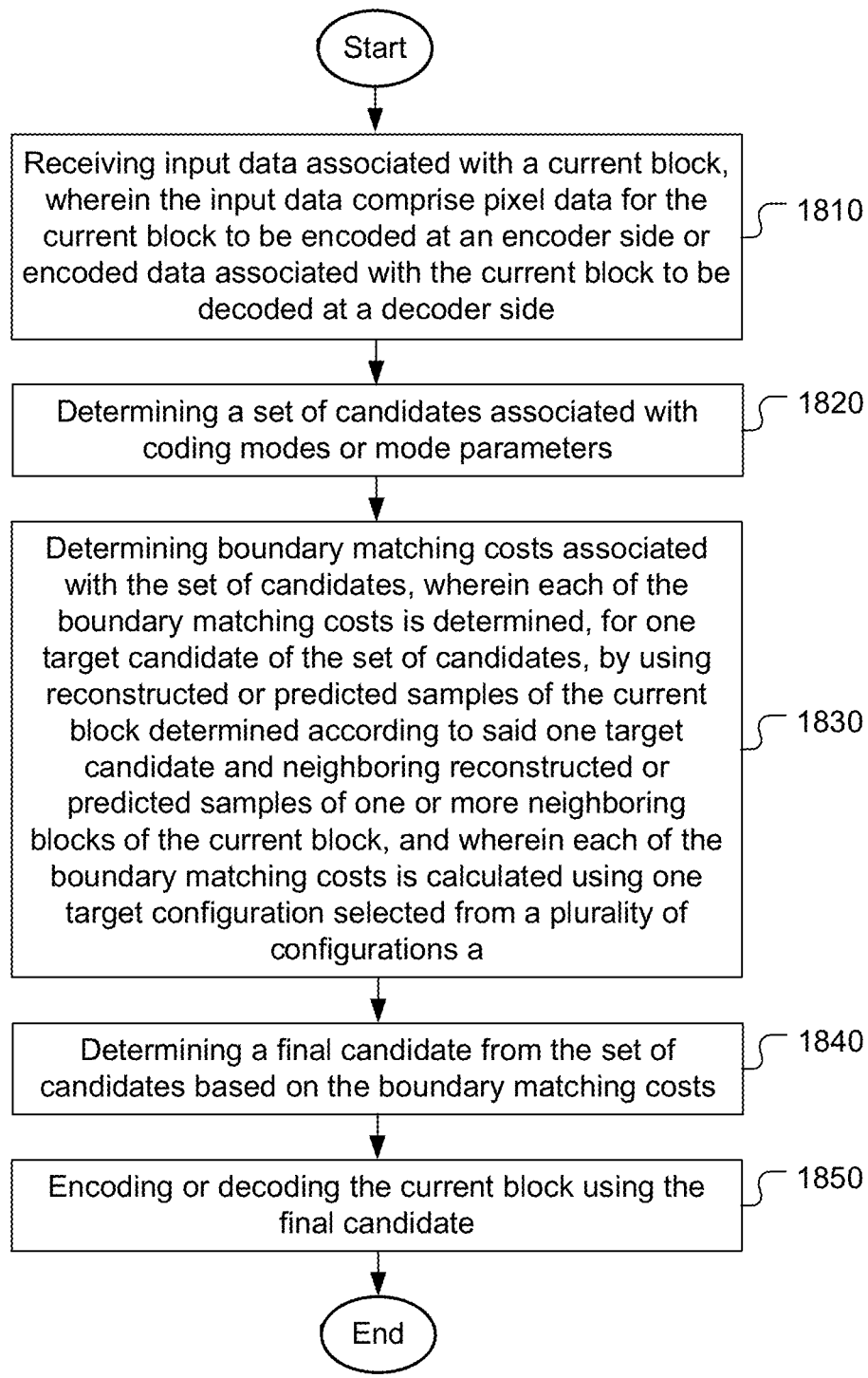
FIG. 18 illustrates a flowchart of an exemplary video coding system that utilizes selective boundary matching based on coding context of the current block and its neighboring blocks according to an embodiment of the present invention.

FIG. 18 illustrates a flowchart of an exemplary video coding system that utilizes selective boundary matching based on coding context of the current block and its neighboring blocks according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data associated with a current block are received in step 1810, wherein the input data comprise pixel data for the current block to be encoded at an encoder side or encoded data associated with the current block to be decoded at a decoder side. A set of candidates associated with coding modes or mode parameters is determined in step 1820. Boundary matching costs associated with the set of candidates are determined in step 1830, wherein each of the boundary matching costs is determined, for one target candidate of the set of candidates, by using reconstructed or predicted samples of the current block determined according to said one target candidate and neighboring reconstructed or predicted samples of one or more neighboring blocks of the current block, and wherein each of the boundary matching costs is calculated using one target configuration selected from a plurality configurations. A final candidate is selected from the set of candidates based on the boundary matching costs in step 1840. The current block is encoded or decoded using the final candidate in step 1850.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
receiving input data associated with a current block, wherein the input data comprise pixel data for the current block to be encoded at an encoder side or encoded data associated with the current block to be decoded at a decoder side;
determining a set of candidates associated with coding modes or mode parameters;
determining boundary matching costs associated with the set of candidates, wherein each of the boundary matching costs is determined, for one target candidate of the set of candidates, by using reconstructed or predicted samples of the current block determined according to said one target candidate and neighboring reconstructed or predicted samples of one or more neighboring blocks of the current block, and wherein each of the boundary matching costs is calculated using one target configuration selected from a plurality of configurations;
determining a final candidate from the set of candidates based on the boundary matching costs; and
encoding or decoding the current block using the final candidate,
wherein each of the boundary matching costs is determined for one weighting using the reconstructed samples of the current block derived according to said one weighting, and a weighting index is signaled at the encoder side or parsed at the decoder side for selecting a final weighting value from re-ordered weightings according to the boundary matching costs.

2. The method of claim 1, wherein at least one of the plurality configurations excludes, for said determining boundary matching costs, top-side pixels or left-side pixels of the current block and corresponding top-side pixels or corresponding left-side pixels of said one or more neighboring blocks.

3. The method of claim 2, wherein said at least one of the plurality configurations depends on at least two motion vectors of the current block and said one or more neighboring blocks.

4. The method of claim 3, wherein the top-side pixels or the left-side pixels of the current block and the corresponding top-side pixels or the corresponding left-side pixels of said one or more neighboring blocks are excluded if one or more motion vector differences between the current block and said one or more neighboring blocks exceed a threshold on a corresponding top side or a corresponding left side.

5. The method of claim 3, wherein similarity or differences of said at least two motion vectors of the current block and said one or more neighboring blocks are determined on a pixel-wise, subblock-wise, or block-wise basis.

6. The method of claim 1, wherein at least one of the plurality configurations only includes, for said determining boundary matching costs, top-side pixels or left-side pixels of the current block and corresponding top-side pixels or corresponding left-side pixels of said one or more neighboring blocks.

7. The method of claim 1, wherein at least one of the plurality configurations calculates boundary matching in an angular direction other than a horizontal direction and a vertical direction.

8. The method of claim 7, wherein one or more syntax elements associated with the angular direction is signaled in a bitstream at the encoder side or parsed from the bitstream at the decoder side.

9. The method of claim 8, wherein said one or more syntax elements are signaled in the bitstream or parsed from the bitstream in a CU (coding unit), PU (prediction unit) or CTU (coding tree unit) level.

10. The method of claim 7, wherein the angular direction of the current block is predicted based on the angular direction of one neighboring block.

11. The method of claim 7, wherein the angular direction of the current block is implicitly determined by analyzing context information of L-shape neighboring pixels of the current block.

12. The method of claim 1, wherein the set of candidates corresponds to weightings of BCW.

13. The method of claim 1, wherein each of the boundary matching costs is calculated using one target configuration selected from a plurality configurations according to one or more coding information or contexts of the current block and/or said one or more neighboring blocks of the current block.

14. A method of video coding, the method comprising:
receiving input data associated with a current block, wherein the input data comprise pixel data for the current block to be encoded at an encoder side or encoded data associated with the current block to be decoded at a decoder side;
determining a set of candidates associated with coding modes or mode parameters;
determining boundary matching costs associated with the set of candidates, wherein each of the boundary matching costs is determined, for one target candidate of the set of candidates, by using reconstructed or predicted samples of the current block determined according to said one target candidate and neighboring reconstructed or predicted samples of one or more neighboring blocks of the current block, and wherein each of the boundary matching costs is calculated using one target configuration selected from a plurality of configurations;
determining a final candidate from the set of candidates based on the boundary matching costs; and
encoding or decoding the current block using the final candidate, wherein each of the boundary matching costs is determined for one weighting using the predicted samples of the current block derived according to said one weighting.

15. The method of claim 14, wherein a final weighting value corresponding to a smallest boundary matching cost is selected implicitly.

16. An apparatus for video coding, the apparatus comprising one or more electronics or processors arranged to:
receive input data associated with a current block, wherein the input data comprise pixel data for the current block to be encoded at an encoder side or encoded data associated with the current block to be decoded at a decoder side;
determine a set of candidates associated with coding modes or mode parameters;
determine boundary matching costs associated with the set of candidates, wherein each of the boundary matching costs is determined, for one target candidate of the set of candidates, by using reconstructed or predicted samples of the current block determined according to said one target candidate and neighboring reconstructed or predicted samples of one or more neighboring blocks of the current block, and wherein each of the boundary matching costs is calculated using one target configuration selected from a plurality of configurations;
determine a final candidate from the set of candidates based on the boundary matching costs; and
encode or decode the current block using the final candidate,
wherein each of the boundary matching costs is determined for one weighting using the reconstructed samples of the current block derived according to said one weighting, and a weighting index is signaled at the encoder side or parsed at the decoder side for selecting a final weighting value from re-ordered weightings according to the boundary matching costs.

* * * * *